United States Patent [19]

Kirner

[11] Patent Number: 5,268,023
[45] Date of Patent: Dec. 7, 1993

[54] NITROGEN ADSORPTION WITH HIGHLY LI EXCHANGED X-ZEOLITES WITH LOW SI/AL RATIO

[75] Inventor: John F. Kirner, Orefield, Pa.

[73] Assignee: Air Products and Chemicals, Inc., Allentown, Pa.

[21] Appl. No.: 957,532

[22] Filed: Oct. 5, 1992

[51] Int. Cl.$^5$ ............................................. B01D 53/04
[52] U.S. Cl. ......................................... 95/103; 95/130
[58] Field of Search ................... 55/25, 26, 58, 62, 68, 55/75, 389

[56] References Cited

U.S. PATENT DOCUMENTS

| | | | |
|---|---|---|---|
| 3,140,931 | 7/1964 | McRobbie | 55/25 |
| 3,140,933 | 7/1964 | McKee | 55/68 |
| 3,313,091 | 4/1967 | Berlin | 55/58 |
| 4,013,429 | 3/1977 | Sircar et al. | 55/33 |
| 4,606,899 | 8/1986 | Butter et al. | 423/328 |
| 4,810,265 | 3/1989 | Lagree et al. | 55/75 X |
| 4,859,217 | 8/1989 | Chao | 55/68 |
| 4,925,460 | 5/1990 | Coe et al. | 55/75 X |
| 4,964,889 | 10/1990 | Chao | 55/75 X |
| 5,152,813 | 10/1992 | Coe et al. | 55/75 X |
| 5,171,333 | 12/1992 | Maurer | 55/75 X |
| 5,174,979 | 12/1992 | Chao et al. | 55/58 X |

FOREIGN PATENT DOCUMENTS

1580928 12/1980 United Kingdom .

OTHER PUBLICATIONS

Sherry, H. S.; *J. Phys. Chem;* 1966, 70, 1158; "The Ion-Exchange Properties Zeolites. I. Univalent Ion Exchange in Syn. Faujasite".
Kuhl, G. H.; "Crystallization of Low-Silica Faujasite"; *Zeolites;* 1987, 1, 451.
Lechert, H. et al.; "Investigations on the Crystallization of X-Type Zeolites"; *Zeolites;* 1991, 11, 720.
Smith, O. J. et al.; "The Optimal Design of Pressure Swing Adsorption Systems"; *Chem. Eng. Sci.,* 1991, 46(12), 2967-2976.
Meyers, A. L. et al.; "Thermodynamics of Mixed-Gas Adsorption"; *Am. Inst. of Chem. Eng. J.;* 1965, 11, 121.
McCabe, W. L. et al.; "Unit Operations of Chemical Engineering"; 3rd Ed; McGraw Hill New York, 1976, p. 534.
Miller, G. W.; "Equilibria of Nitrogen, Oxygen, Argon, and Air in Molecular Sieve 5A"; *Am. Inst. of Chem. Eng. J.;* 1987, 33, 194.

*Primary Examiner*—Robert Spitzer
*Attorney, Agent, or Firm*—Geoffrey L. Chase; James C. Simmons; William F. Marsh

[57] ABSTRACT

Low silica X (LSX) zeolites having a framework Si/Al ratio equal to 1.0 with lithium exchange levels greater than a threshold level of 70% exhibit unexpectedly higher capacity for nitrogen adsorption compared to LSX-zeolite with lower lithium exchange levels. These materials provide high performance adsorbents for PSA air separation processes at a lower cost for the adsorbent because of the lower threshold lithium exchange levels compared to highly exchanged lithium X-zeolite known in the prior art.

17 Claims, 2 Drawing Sheets

NITROGEN ADSORPTION WITH HIGHLY LI EXCHANGED X-ZEOLITES WITH LOW SI/AL RATIO

TECHNICAL FIELD

The present invention is directed to gas separations using nitrogen selective adsorbents. More particularly, the present invention is directed to lithium exchanged X-zeolites with low Si/Al ratios to recover oxygen or nitrogen from gas mixtures containing them, such as air. Additionally, an objective is a reduced level of lithium in order to reduce the cost of the adsorbent.

BACKGROUND OF THE PRIOR ART

Adsorptive separations using zeolitic structures as adsorbents are well known in the prior art for resolving a multitude of gas mixtures. Such separations are predicated upon the compositions of the gas mixtures and the components' selectivity for adsorption on adsorbents, such as zeolites.

The use of nitrogen in industrial gas applications has seen significant growth, particularly with the development of non-cryogenic gas mixture separations. A major field of nitrogen separation comprises the separation of nitrogen from air. The removal of nitrogen from air results in an enriched oxygen gas component which is less strongly adsorbed by appropriate zeolites which are selective for nitrogen adsorption. When oxygen is desired as product typically at elevated pressure, it is desirable to adsorb nitrogen from air to result in unadsorbed oxygen enriched product passing over a nitrogen selective adsorbent. The nitrogen is then removed during a stage of desorption, typically at lower pressure. This results in oxygen being recovered at the pressure of the feed air, while nitrogen is recovered at a pressure below the feed air pressure. As a result, for the production of oxygen without significant pressure loss in an adsorptive separation of air, it is desirable to utilize nitrogen selective adsorbents, such as the family of zeolites.

Although various zeolites are naturally occurring and various synthetic zeolites are known, some of which have appropriate selectivities for nitrogen over oxygen and other less strongly adsorbed substances such as hydrogen, argon, helium, and neon, the industry has attempted to enhance the performance of various zeolites to improve their selectivity and capacity for nitrogen over such less strongly adsorbed substances such as oxygen.

For instance, U.S. Pat. No. 3,140,931 claims the use of crystalline zeolitic molecular sieve material having apparent pore sizes of at least 4.6 Angstroms for separating oxygen-nitrogen mixtures at subambient temperatures. U.S. Pat. No. 3,140,933 claims the use of lithium X-zeolite to separate oxygen-nitrogen mixtures at feed pressures between 0.5 and 5 atm and at a temperature between about 30° C. and −150° C. U.S. Pat. No. 4,859,217 claims a process for selectively adsorbing nitrogen using X-zeolite having a framework Si/Al molar ratio not greater than 1.5 and having at least 88% of its $AlO_2$ tetrahedral units associated with lithium cations. This invention is based on the discovery that nitrogen adsorption from lithium X-zeolite at very high levels of lithium exchange is not predictable from the trend of the data obtained for samples with less than 86 equivalent percent lithium exchange and the remainder principally sodium.

Despite the performance of very high lithium exchange levels of X-zeolite for air separation, lower exchange levels of lithium would be desirable because it is costly to manufacture highly lithium exchanged materials. Large amounts of expensive lithium salts are required to prepare the highly lithium exchanged forms from the as-synthesized sodium form because the ion exchange of lithium for sodium is thermodynamically unfavorable.

The present invention overcomes the drawbacks of synthesizing high lithium exchange while still providing good performance as will be set forth in greater detail below.

BRIEF SUMMARY OF THE INVENTION

The present invention is a process for selectively adsorbing nitrogen from a gas mixture containing nitrogen and at least one less strongly adsorbed component which comprises contacting the gas mixture with an adsorbent which is selective for the adsorption of nitrogen, comprising a crystalline X-zeolite having a zeolitic Si/Al ratio less than 1.25 and a lithium ion exchange level of the exchangeable ion content greater than 70% and less than 88%.

Preferably, the zeolite is ion exchanged with lithium to a level greater than $(72 \times (Si/Al\ ratio) - 2)\%$.

Preferably, the zeolite is ion exchanged with lithium to a level greater than 77%, but less than 88%.

Preferably, the zeolite is ion exchanged with lithium to a level of 85%.

Preferably, the Si/Al ratio is less than 1.1.

More preferably, the Si/Al ratio is approximately 1.

Preferably, the gas mixture contains nitrogen and oxygen.

More preferably, the gas mixture is air.

Preferably, an oxygen and nitrogen containing gas mixture contacts a zone of such adsorbent, the nitrogen is selectively adsorbed and the oxygen passes through the zone and is recovered as an oxygen enriched product.

Preferably, the oxygen product has a purity of at least approximately 90% oxygen.

Preferably, the adsorption is conducted at an average bed temperature in the range of approximately 55° to 135° F.

Preferably, the zone is operated through a series of steps comprising: adsorption, during which the gas mixture contacts the adsorbent, nitrogen is selectively adsorbed and oxygen passes through the zone as product; depressurization during which the gas mixture contact is discontinued and the zone is reduced in pressure to desorb the nitrogen; and repressurization with oxygen product to the adsorption pressure.

Preferably, the adsorption pressure is in the range of approximately 35 to 65 psia.

Preferably, the depressurization is conducted down to a level in the range of approximately 14.7 to 16.7 psia.

Alternatively, the zone is operated through a series of steps comprising: adsorption, during which the gas mixture contacts the adsorbent, nitrogen is selectively adsorbed and oxygen passes through the zone as product; depressurization during which the gas mixture contact is discontinued and the zone is reduced in pressure to desorb the nitrogen; evacuation to further desorb the nitrogen to below ambient pressure; and repressurization with oxygen product to the adsorption pressure.

Preferably, the adsorption pressure of this alternative is in the range of approximately 900 to 1600 torr.

Preferably, the evacuation is conducted down to a level in the range of approximately 80 to 400 torr.

DETAILED DESCRIPTION OF THE INVENTION

Figure 1:
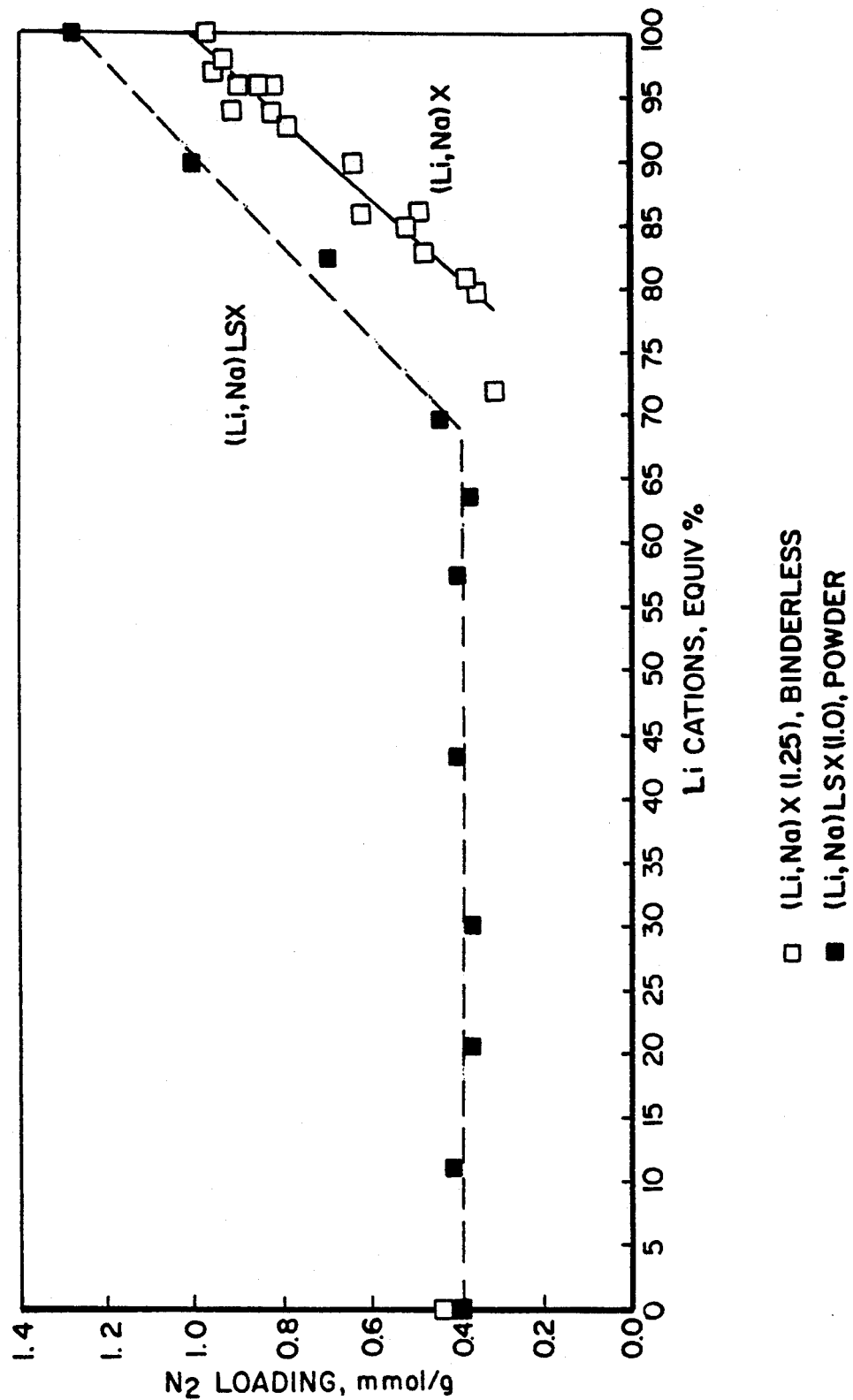
FIG. 1 is a graph of $N_2$ capacity at 0.9 atm, 23° C. as a function of lithium exchange level for powder lithium, sodium LSX-zeolite (Si/Al=1.0) observed in the present invention and for binderless lithium, sodium X-zeolite (Si/Al=1.25) disclosed in U.S. Pat. No. 4,859,217.

The process of the present invention, directed to nitrogen adsorption from gas mixtures of less strongly adsorbed components, such as oxygen, hydrogen, argon, and helium, is achieved by the use of a crystalline X-zeolite having a zeolitic Si/Al ratio less than 1.25 and a lithium ion exchange level of the exchangeable ion content greater than 70% and less than 88%. The threshold lithium exchange level required to observe the improved performance of the present invention varies with Si/Al ratio, and can be described by the equation:

threshold lithium exchange
level=(72×(Si/Al)−2)%

Preferably, the X-zeolite is a low silica X-zeolite (LSX-zeolite) having a framework Si/Al ratio of approximately 1 and with a lithium exchange level greater than 77%, but less than 88%.

Lithium, sodium LSX-zeolites having a framework Si/Al ratio equal to 1.0 with lithium exchange levels greater than a threshold level of 70% exhibit unexpectedly higher capacity for nitrogen adsorption compared to LSX-zeolite with lower lithium exchange levels. The threshold lithium exchange level for improved performance over the pure sodium form is unexpectedly lower for lithium, sodium LSX-zeolite (Si/Al=1.0) than for lithium, sodium X-zeolite (Si/Al=1.25). Furthermore, for any lithium exchange level greater than 70%, the nitrogen capacity of lithium, sodium LSX-zeolite is always higher than that for lithium, sodium X-zeolite at the same lithium exchange level.

These materials provide high performance adsorbents for PSA air separation processes at a lower cost for the adsorbent because of the lower threshold lithium exchange levels compared to highly exchanged lithium X-zeolite known in the prior art.

A variety of synthesis processes are available to prepare the preferred low silica X-zeolite. In U.K. Patent 1,580,928, a process for making low silica X-zeolites is set forth comprising preparing an aqueous mixture of sources of sodium, potassium, aluminate, and silicate, and crystallizing the mixture at below 50° C. or aging the mixture at 50° C. or below followed by crystallizing the same at a temperature in the range of 60° C. to 100° C.

Gunter H. Kuhl in an article, "Crystallization of Low-Silica Faujasite," appearing in Zeolites 1987, 7, 451, disclosed a process for making low silica X-zeolites comprising dissolving sodium aluminate in water with the addition of NAOH and KOH. Sodium silicate was diluted with the remaining water and rapidly added to the $NaAlO_2$—NaOH—KOH solution. The gelled mixture was then aged in a sealed plastic jar for a specified time at a specified temperature. The product was filtered and washed.

In U.S. Pat. No. 4,606,899, a process for preparing Maximum Aluminum X-zeolite from clay is set forth in which kaolin clay, calcined to at least 700° C. is converted to LSX-zeolite by agitating a reaction mixture, comprised of the clay with sodium and potassium hydroxide, at temperatures in excess of 50° C. and seeding the resulting mixture with LSX-zeolite at a predetermined time after the reaction has been initiated.

Other processes are available for preparing X-zeolite with Si/Al ratios intermediate between than of LSX-zeolite (Si/Al=1.0) and conventional X-zeolite (Si/Al 1.25) such as that described in Lechert, H. and Kacirek, H. Zeolites 1991, 11, 720, which shows that the Si/Al ratio of crystallizing X zeolites depends distinctly on the alkalinity of the batch but only weakly on its Si/Al ratio.

Although other ion forms of X-zeolites with Si/Al ratios less than 1.25 can be used, typically the as-synthesized sodium or mixed sodium, potassium X-zeolite is used to prepare the lithium exchanged zeolite using ion exchange procedures well known in the art. Typically the ion exchange is accomplished by contacting the sodium or mixed sodium, potassium X-zeolite with an aqueous solution of a lithium salt. Because the exchange is thermodynamically unfavorable, multiple stages would normally be required. Alternatively, the ion exchange can be performed by contacting the zeolite with lithium solution in a column after granulating the assynthesized form of the zeolite. Other methods of ion exchange are contemplated and can be used for the present invention.

For use in industrial gas separation processes, the zeolite is generally used in granulated form. A variety of processes are known in the art using binders, such as clays, silica, alumina, and the like, and granulation equipment, such as extruders, disk or roll granulators, and the like.

The adsorbent must be dehydrated before being used for gas separation using a thermal activation step. Such a thermal activation step can be achieved by a number of different methods in which the zeolitic water and the hydration spheres are carefully removed and the amount of water in the gaseous environment in contact with the zeolite during this step is minimized.

A preferred use for the lithium exchanged X-zeolites of the present invention is the separation of nitrogen from oxygen in air using a pressure swing adsorption (PSA) or vacuum swing adsorption (VSA) process. In such a process, an adsorbent bed comprising lithium X-zeolite, as described above, is initially pressurized with oxygen. A gas stream comprising nitrogen and oxygen, such as air, at a temperature between 0° and 50° C. and a pressure between 1 atmosphere and 5 atmospheres, is passed over the adsorbent bed. A portion of the nitrogen in the gas stream is adsorbed by said lithium exchanged X-zeolite, thereby producing an oxygen-enriched product stream. The nitrogen containing adsorbent bed is subsequently depressurized and evacuated with the option of being purged with oxygen enriched gas to produce a nitrogen enriched stream. The bed is then repressurized with product oxygen and adsorption can be reinitiated.

Alternatively, these materials can be used for recovering a nitrogen enriched product using, for example, an existing nitrogen vacuum swing adsorption process as described in U.S. Pat. No. 4,013,429, wherein the process includes the steps of feed, rinse, desorption, and repressurization wherein the nitrogen enriched product is recovered as the absorbate during desorption.

The zeolitic adsorbents used in demonstrating the invention were prepared in the following way.

Sodium, potassium LSX-zeolite was prepared by the method of Kuhl ("Crystallization of Low-Silica Faujasite" in Zeolites 1987, 7, 451) which comprises dissolving sodium aluminate in water with the addition of NaOH and KOH. Sodium silicate is diluted with the remaining water and rapidly added to the NaAlO$_2$—NaOH—KOH solution. The gelled mixture is then aged in a sealed plastic jar for a specified time at a specified temperature. The product is filtered and washed.

Lithium LSX-Zeolite was prepared by ion exchange of sodium, potassium LSX-zeolite powder using five static exchanges at 100° C. with a 6.3-fold equivalent excess of 2.2 M LiCl. Sodium LSX-zeolite was prepared by ion exchange of sodium, potassium LSX-zeolite using three static exchanges at 100° C. with a 4.2-fold equivalent excess of 1.1 M NaCl. Various exchange levels of lithium, sodium LSX-zeolite were prepared by adding separate samples of the initially prepared lithium LSX-zeolite powder to appropriate amounts of 0.1 M NaCl and stirring at room temperature for about 4 hours. The mixed cation samples were filtered but not washed to prevent hydrolysis of the lithium cations. The use of dilute solution made the errors in cation levels introduced by the solution retained on the filter cake insignificant.

The samples were analyzed by Inductively Coupled Plasma-Atomic Emission Spectroscopy (ICP-AES) for silicon and aluminum and Atomic Absorption Spectroscopy for lithium, sodium, and potassium. Table I contains the results of elemental analyses for lithium and sodium in the exchanged samples.

Adsorptive capacities for nitrogen (N$_2$) were obtained using a conventional McBain gravimetric adsorption unit. Samples were first superficially dried at 110° C. in an oven purged with N$_2$ at a high flow rate. Approximately 5 g were loaded into the McBain sample buckets, and the samples were heated under vacuum at 1° C./min or less to 550° C. The samples were held at 550° C. until the pressure dropped to about 10 microns of Hg. After activation, N$_2$ isotherms were obtained to 1 atm at 23° C. The isotherm data was fit to the Langmuir expression:

$$N_m = mbP/(1+Bp)$$

where $N_m$ is the amount adsorbed, P is the pressure, m is the monolayer capacity, and b is the affinity parameter. The fits were used to generate N$_2$ capacities and isothermal N$_2$ working capacities (reported in Table I).

FIG. 1 compares N$_2$ capacity at 0.9 atm, 23° C. as a function of lithium exchange level in lithium, sodium LSX-zeolite (Si/Al = 1.0) to N$_2$ capacity at 700 torr, 23° C. for lithium, sodium X-zeolite (Si/Al = 1.25) disclosed in U.S. Pat. No. 4,859,217. For lithium, sodium LSX-zeolite with lithium exchange levels of 64% and lower, N$_2$ capacity is indistinguishable from the N$_2$ capacity of the 100% sodium form, with an N$_2$ capacity of about 0.39 mmol/g. For lithium, sodium LSX-zeolite with lithium exchange levels from about 70% to 100%, N$_2$ capacity increases nearly linearly with increasing lithium exchange level. The threshold lithium exchange level for improved performance over the pure sodium form is unexpectedly lower for lithium, sodium LSX-zeolite than for lithium, sodium X-zeolite. Furthermore, for any lithium exchange level greater than 70%, the N$_2$ capacity of lithium, sodium LSX-zeolite is always higher than that for lithium, sodium X-zeolite at the same lithium exchange level.

The N$_2$ capacities of lithium, sodium LSX-zeolites with lithium exchange levels above about 70% could not have been predicted based on the most relevant prior art of U.S. Pat. No. 3,140,933 and U.S. Pat. No. 4,859,217. Although U.S. Pat. No. 3,140,933 teaches the benefits of lithium exchanged X-zeolites, it does not indicate any further benefits to be gained by using X-zeolite with Si/Al ratios lower than 1.25. In the present invention, it has been found unexpectedly that the N$_2$ capacity of LSX-zeolite (Si/Al = 1.0) is always higher than the N$_2$ capacity of X-zeolite (Si/Al = 1.25) at the same lithium exchange level, provided that the lithium exchange level is above the threshold level of 70% Li exchange. As a specific example, the N$_2$ capacity of 0.87 mmol/g for 86% lithium LSX-zeolite is substantially higher than the N$_2$ capacity of 0.56 mmol/g for 86% lithium X-zeolite, the lithium exchange level specifically disclosed for lithium X-zeolite in U.S. Pat. No. 3,140,933. (The N$_2$ capacities for 86% lithium exchange

TABLE 1

| | | Nitrogen Capacity and N$_2$/O$_2$ Selectivity for Lithium, Sodium LSX-Zeolite | | | |
|---|---|---|---|---|---|
| sample number | Li/Al eq ratio | Na/Al eq ratio | $N_m$ (obs),$^a$ mmol/g 0.9 atm | 1.0 atm | $N_m$ (delta),$^b$ mmol/g | $\alpha$ (N$_2$O$_2$)$^c$ |
| 1 | 1.03 | 0.01 | 1.28 | 1.35 | 0.90 | 10.0 |
| 2 | 0.90 | 0.10 | 1.01 | 1.06 | 0.70 | n/a |
| 3 | 0.83 | 0.20 | 0.70 | 0.74 | 0.51 | 5.7 |
| 4 | 0.70 | 0.27 | 0.44 | 0.47 | 0.32 | 4.0 |
| 5 | 0.64 | 0.34 | 0.38 | 0.40 | 0.28 | n/a |
| 6 | 0.58 | 0.45 | 0.40 | 0.42 | 0.29 | n/a |
| 7 | 0.43 | 0.55 | 0.40 | 0.42 | 0.29 | n/a |
| 8 | 0.30 | 0.66 | 0.36 | 0.39 | 0.26 | n/a |
| 9 | 0.21 | 0.75 | 0.37 | 0.39 | 0.26 | n/a |
| 10 | 0.11 | 0.86 | 0.41 | 0.44 | 0.31 | n/a |
| 11 | n/a | 1.00 | 0.40 | 0.43 | 0.30 | 3.6 |

$^a$N$_m$ (obs) = nitrogen capacity at 23° C. at indicated pressure.
$^b$N$_m$ (delta) = isothermal nitrogen working capacity from 0.2 to 1.0 atm at 23° C.
$^c\alpha$ (N$_2$/O$_2$) = N$_2$/O$_2$ selectivity for air at 1.45 atm, 30° C., calculated from IAST.
n/a = not analyzed were obtained from straight line fits to the high lithium exchange data in FIG. 1 for LSX-zeolite and X-zeolite.)

U.S. Pat. No. 4,859,217, on the other hand, did recognize the outstanding performance of lithium LSX-zeolite (Si/Al=1.0) over lithium X-zeolite (Si/Al=1.25), but only at essentially 100% lithium exchange. It does not suggest that the threshold lithium exchange level to demonstrate improved performance of the lithium, sodium form over the pure sodium form would be lower for LSX-zeolite than for X-zeolite. In the present invention it has been found unexpectedly that the threshold for enhanced nitrogen capacity of 70% lithium exchange for LSX-zeolite with Si/Al=1.0 is substantially lower than the threshold of 88% claimed in U.S. Pat. No. 4,859,217 for X-zeolite with Si/Al<1.5.

$N_2$ capacities of lithium, sodium LSX-zeolites with lithium exchange levels above about 77% are even more unexpected than the $N_2$ capacities of those with lithium exchange levels above about 70% compared to the most relevant prior art of U.S. Pat. No. 3,140,933 and U.S. Pat. No. 4,859,217. The $N_2$ capacity of 0.62 mmol/g observed for 77% lithium LSX-zeolite is significantly higher than the $N_2$ capacity of 0.56 mmol/g observed for the 86% lithium X-zeolite disclosed in U.S. Pat. No. 3,140,933 and about the same as the $N_2$ capacity of 0.62 mmol/g observed for the threshold exchange level of 88% lithium X-zeolite in U.S. Pat. No. 4,859,217.

The threshold lithium exchange level of 70% observed for lithium, sodium LSX-zeolite (Si/Al=1.0) can be combined with the threshold lithium exchange level of 88% disclosed for lithium, sodium X-zeolite (Si/Al=1.25) in U.S. Pat. No. 4,859,217 to predict threshold lithium exchange levels for X-zeolites with Si/Al ratios intermediate between 1.0 and 1.25:

threshold lithium exchange
level=(72×(Si/Al)−2)%

$N_2$ capacity alone is not a measure of an adsorbent's ability to effect a separation of $N_2$ from other components. Berlin in U.S. Pat. No. 3,313,091 points out the importance of the shape and slope of the component isotherms in the pressure region of interest. Consequently, the isothermal $N_2$ working capacities from 0.2 to 1.0 atm, a pressure region of interest for $O_2$ VSA air separation processes, were also determined from the isotherm fits and are included in Table I. The adsorbents of the present invention also show high isothermal $N_2$ working capacities which are very important for PSA $N_2$ processes.

An additional property required of nitrogen adsorbents is high selectivity for adsorption of nitrogen over the less strongly adsorbed components of the gas mixture to be separated. For example, the binary $N_2/O_2$ selectivity at feed pressure is an indicator of the recovery losses from oxygen coadsorbed with nitrogen on the adsorbent bed in oxygen VSA air separation processes.

Figure 2:
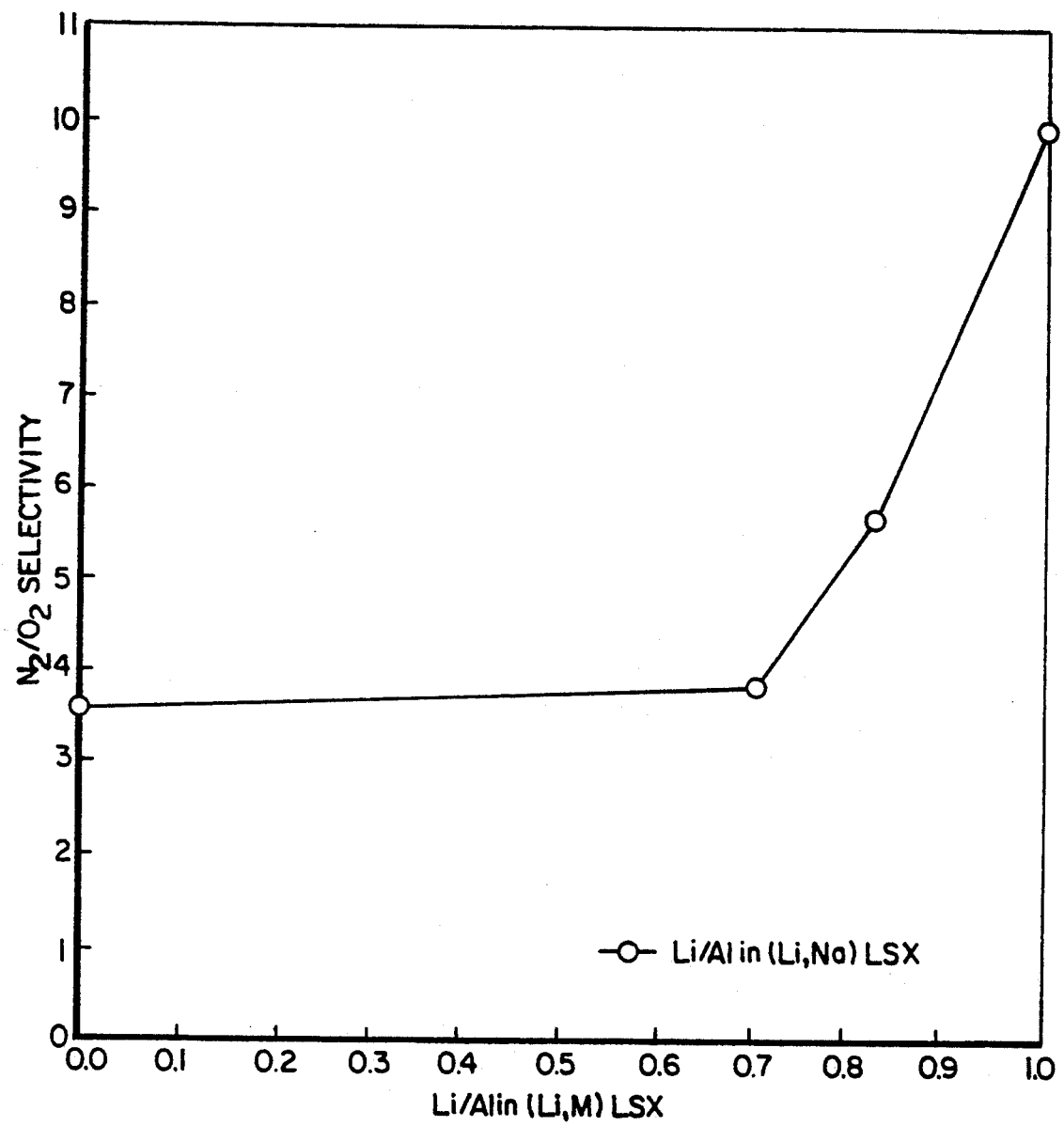
FIG. 2 is a graph of binary $N_2/O_2$ selectivity calculated by IAST for air feed at 1.45 atmospheres at 30° C. as a function of lithium exchange level for lithium, sodium LSX-zeolite (Si/Al=1.0) observed in the present invention.

$N_2$ and $O_2$ isotherms were obtained for several of the lithium, sodium LSX-zeolite samples using a high pressure volumetric isotherm unit. Approximately 2–2.5 g of sample was loaded into a stainless steel sample cylinder protected with a 20-micron filter to prevent loss of sample. The samples were heated under vacuum at 1° C./min or less to 400° C. and held at 400° C. until the pressure dropped below $1 \times 10^{-5}$ torr. After activation, $N_2$ and $O_2$ isotherms were obtained to 12,000 torr at 23° and 45° C. The isotherm data was fit to standard adsorption isotherms. Binary $N_2/O_2$ selectivities were calculated using ideal adsorbed solution theory (IAST) for air feed at 1.45 atmospheres, 30° C., where $N_2/O_2$ selectivity is defined as:

$$\alpha(N_2/O_2) = \frac{N_{N2}/Y_{N2}}{N_{O2}/Y_{O2}}$$

where
$N_{N2}$=$N_2$ coadsorbed at $N_2$ partial pressure in the feed
$N_{O2}$=$O_2$ coadsorbed at $O_2$ partial pressure in the feed
$Y_{N2}$=mole fraction of $N_2$ in the feed
$Y_{O2}$=mole fraction of $O_2$ in the feed The binary $N_2/O_2$ selectivities are also included in Table I. The adsorbents of the present invention also show high $N_2/O_2$ selectivity. The threshold lithium exchange level for observing an improvement in the $N_2/O_2$ selectivity of lithium, sodium LSX-zeolite over that of the pure sodium form is also about 70% as in the case of nitrogen capacity. See FIG. 2.

$O_2$ VSA process performance was simulated using a global energy and mass balance model similar to one described by Smith, O. J. and Westerberg, A. W. "The Optimal Design of Pressure Swing Adsorption Systems", Chemical Eng. Sci. 1991, 46(12), 2967–2976, which is routinely used as an indicator of relative performance in adsorbent screening. This model is similar to "Flash" calculations in distillation (e.g., McCabe, W. L. and Smith, J. C., "Unit Operations in Chemical Engineering, 3rd edition, McGraw Hill, New York (1976), p 534).

The computer process model was used to simulate a standard $O_2$ VSA process cycle such as that described in G.B. 2,109,266-B that included adsorption, purge, and desorption at chosen pressures and end-of-feed temperature. The model is equilibrium based; i.e., it assumes no spatial concentration gradients and complete bed utilization. Temperature changes within the bed during the cycle are included, but the model does not account for temperature gradients (i.e., the bed temperature is uniform at any given time). As a first approximation, this is a reasonable assumption in the case of equilibrium-based separation processes. Binary equilibria are estimated using ideal adsorbed solution theory (IAST) (Meyers, A. L. and Prausnitz, J. M. American Institute of Chemical Engineers Journal 1965, 11, 121). This theory is accepted for physical adsorption of nitrogen-oxygen mixtures on zeolites at ambient temperatures (Miller, G. W.; Knaebel, K. S.; Ikels, K. G. "Equilibria of Nitrogen, Oxygen, Argon, and Air in Molecular Sieve 5A", American Institute of Chemical Engineers Journal 1987, 33, 194). Inputs for the program include isotherm parameters for $N_2$ and $O_2$, and adsorbent physical properties.

By way of placing the model in perspective, its predictions are comparable with data from an experimental vacuum swing adsorption unit with 8 feet long, 4 inch diameter beds. Data were compared for three different adsorbents at a variety of operating conditions. There is excellent agreement between pilot unit data and model predictions for Bed Size Factor (BSF), $O_2$ Recovery, and Actual Cubic Feet evacuated per lb/mole Evacuation gas (ACF/Evac). These are the key parameters that determine the product cost from any oxygen VSA plant.

Table II compares the results of the process simulations for an $O_2$ VSA process cycle with a feed pressure of 1000 torr, an end of feed temperature of 75° F., and an evacuation pressure of 300 torr for lithium, sodium LSX-zeolite containing 85% lithium to a typical commercial 5A zeolite used for air separation. The Recovery, BSF, and ACF/Evac are normalized to a value of 1.0 for the commercial 5A zeolite. The 85% lithium, sodium LSX-zeolite of the present invention has significantly higher Recovery and lower BSF than the commercial 5A zeolite, and only moderately higher ACF/Evac.

TABLE II

| O$_2$ VSA Computer Process Simulations | | | |
|---|---|---|---|
| sample identity | relative Recovery | relative BSF | relative ACF/Evac |
| commercial 5A | 1.00 | 1.00 | 1.00 |
| 15% (Na, Li) LSX | 1.24 | 0.65 | 1.05 |

The present invention provides a high nitrogen capacity adsorbent at lower exchange levels of lithium than the prior art lithium X-zeolites. This is significant because of the difficulty in achieving high levels of lithium exchange, such as 88% and above. Therefore, the present invention provides a unique solution to the problem of a lower cost, higher performing adsorbent for separating nitrogen from less strongly adsorbed gas species, which is more readily synthesized than prior art adsorbents, particularly at comparable nitrogen capacities.

The present invention has been set forth with regard to several preferred embodiments, but the full scope of the present invention should be ascertained from the claims below.

I claim

1. A process for adsorbing nitrogen from a gas containing nitrogen which comprises contacting the gas with an adsorbent which is selective for the adsorption of nitrogen, comprising a crystalline X-zeolite having a zeolitic Si/Al ratio less than 1.25 and a lithium ion exchange level of the exchangeable ion content greater than 70% and less than 88%.

2. The process of claim 1 wherein said zeolite is ion exchanged with lithium to a level greater than (72×(Si/Al ratio)−2)%.

3. The process of claim 1 wherein said zeolite is ion exchanged with lithium to a level greater than 77%, but less than 88%.

4. The process of claim 3 wherein said zeolite is ion exchanged with lithium to a level of approximately 85%.

5. The process of claim 1 wherein said Si/Al ratio is less than 1.1

6. The process of claim 5 wherein said Si/Al ratio is approximately 1.

7. The process of claim 1 wherein said gas contains nitrogen and oxygen.

8. The process of claim 7 wherein said gas is air.

9. The process of claim 1 wherein an oxygen and nitrogen containing gas contacts a zone of said adsorbent, the nitrogen is selectively adsorbed and the oxygen passes through said zone and is recovered as an oxygen enriched product.

10. The process of claim 9 wherein said oxygen enriched product has a purity of at least approximately 90% oxygen.

11. The process of claim 9 wherein the adsorption is conducted at an average bed temperature in the range of approximately 55° to 135° F.

12. The process of claim 9 wherein said zone is operated through a series of steps comprising: adsorption, during which said gas contacts said adsorbent, nitrogen is selectively adsorbed and oxygen passes through said zone as product; depressurization, during which said gas contact is discontinued and said zone is reduced in pressure to desorb the nitrogen; and repressurization with oxygen product to adsorption pressure.

13. The process of claim 1 wherein the adsorption pressure is in the range of approximately 35 to 65 psia.

14. The process of claim 1 wherein the depressurization is conducted down to a level in the range of approximately 14.7 to 16.7 psia.

15. The process of claim 1 wherein said zone is operated through a series of steps comprising: adsorption, during which said gas contacts said adsorbent, nitrogen is selectively adsorbed and oxygen passes through said zone as product; depressurization, during which said gas contact is discontinued and said zone is reduced in pressure to desorb the nitrogen; evacuation to further desorb the nitrogen to below ambient pressure; and repressurization with oxygen product to the adsorption pressure.

16. The process of claim 15 wherein the adsorption pressure is in the range of approximately 900 to 1600 torr.

17. The process of claim 15 wherein the evacuation is conducted down to a level in the range of approximately 80 to 400 torr.

* * * * *